(12) United States Patent
Brown et al.

(10) Patent No.: US 8,343,409 B2
(45) Date of Patent: Jan. 1, 2013

(54) MOLDING SYSTEM AND MOLDED-IN-COLOR PANEL

(75) Inventors: LaRon Brown, Detroit, MI (US); Brandon Papazian, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/868,294

(22) Filed: Aug. 25, 2010

(65) Prior Publication Data
US 2010/0320646 A1 Dec. 23, 2010

Related U.S. Application Data

(62) Division of application No. 11/766,812, filed on Jun. 22, 2007, now abandoned.

(51) Int. Cl.
*B29C 45/16* (2006.01)
(52) U.S. Cl. ............... 264/328.1; 425/577; 425/110; 425/568; 264/328.14; 264/328.16; 264/156
(58) Field of Classification Search ............... 264/328.1, 264/328.14, 328.16, 155, 156; 425/110, 425/568, 577
See application file for complete search history.

(56) References Cited

U.S. PATENT DOCUMENTS

| | | | |
|---|---|---|---|
| 3,909,175 A | 9/1975 | Gemmill | |
| 4,039,215 A | 8/1977 | Minhinnick | |
| 4,403,933 A | 9/1983 | Davis et al. | |
| 4,832,593 A | 5/1989 | Brown | |
| 5,037,680 A | 8/1991 | Papendick et al. | |
| 5,069,833 A | 12/1991 | Yokoi et al. | |
| 5,178,051 A | 1/1993 | Smith et al. | |
| 5,342,666 A | 8/1994 | Ellison et al. | |
| 5,851,558 A | 12/1998 | Atake | |
| 5,960,527 A | 10/1999 | Ellison et al. | |
| 5,985,198 A | 11/1999 | Harris et al. | |
| 6,165,407 A | 12/2000 | Tahara et al. | |
| 6,168,231 B1 | 1/2001 | Fielding et al. | |
| 6,319,438 B1 | 11/2001 | Smith et al. | |
| 6,468,458 B1 * | 10/2002 | Anderson et al. ............. 264/246 |

(Continued)

FOREIGN PATENT DOCUMENTS
DE 10059160 A1 8/2001
(Continued)

OTHER PUBLICATIONS

"United states: Solway Engineered polymers Innobates" Solvay Press Office, Feb 14, 2004, p. 1.*

(Continued)

*Primary Examiner* — Joseph Del Sole
*Assistant Examiner* — Nahida Sultana
(74) *Attorney, Agent, or Firm* — Damian Porcari; Brooks Kushman P.C.

(57) ABSTRACT

In one embodiment, a molding system for creating a molded-in-color panel has a first mold member with a first forming surface for forming a portion of a panel with an exposed surface. The molding system has a second mold member having a second forming surface for forming a concealed portion of the panel. One of the first and second mold members is translatable relative to the other to collectively receive a heated molded-in-color resin to form the panel. The molding system has an injector for injecting molded-in-color resin into the mold. The second forming surface is sufficiently smooth so that the exposed surface of the panel is free of visible flow lines.

12 Claims, 4 Drawing Sheets

U.S. PATENT DOCUMENTS

| | | | |
|---|---|---|---|
| 6,568,705 B2 | 5/2003 | Kinane | |
| 6,719,938 B2 | 4/2004 | Summerer | |
| 6,838,027 B2 | 1/2005 | Brodi, Jr. et al. | |
| 7,005,103 B2 | 2/2006 | Smith et al. | |
| 7,108,311 B2 | 9/2006 | Dooley et al. | |
| 7,129,439 B2 | 10/2006 | Itakura et al. | |
| 2004/0232303 A1 | 11/2004 | Rausch et al. | |
| 2005/0082712 A1 | 4/2005 | Brodi, Jr. et al. | |
| 2005/0127565 A1 | 6/2005 | Wilson et al. | |
| 2005/0202210 A1 | 9/2005 | Schulthess | |
| 2005/0217790 A1 | 10/2005 | Joachimi et al. | |
| 2005/0252714 A1 | 11/2005 | Goda et al. | |
| 2005/0285303 A1 | 12/2005 | Balint et al. | |
| 2006/0024476 A1 | 2/2006 | Leland et al. | |
| 2006/0030650 A1 | 2/2006 | Koshida et al. | |
| 2006/0043631 A1 | 3/2006 | Lang et al. | |
| 2006/0068193 A1 | 3/2006 | Cowelchuk et al. | |
| 2006/0068206 A1 | 3/2006 | Hala et al. | |
| 2007/0126138 A1* | 6/2007 | Dooley et al. | 264/46.4 |
| 2007/0221352 A1* | 9/2007 | Manda | 164/113 |
| 2008/0191379 A1 | 8/2008 | Samluk et al. | |
| 2008/0318051 A1 | 12/2008 | Brown et al. | |
| 2008/0318052 A1 | 12/2008 | Brown et al. | |
| 2009/0315218 A1* | 12/2009 | Izumo | 264/328.12 |
| 2010/0084842 A1* | 4/2010 | Kong | 280/752 |
| 2010/0295216 A1* | 11/2010 | Shin et al. | 264/328.15 |
| 2011/0233821 A1* | 9/2011 | Bandoh et al. | 264/272.11 |
| 2011/0304069 A1* | 12/2011 | Etoh et al. | 264/161 |
| 2012/0049408 A1* | 3/2012 | Okamoto | 264/255 |
| 2012/0114973 A1* | 5/2012 | Jacobsen et al. | 428/686 |

FOREIGN PATENT DOCUMENTS

| | | |
|---|---|---|
| DE | 10143564 A1 | 3/2003 |
| EP | 1112831 A1 | 7/2001 |
| EP | 1382433 A1 | 1/2004 |
| EP | 1564067 A1 | 8/2005 |
| EP | 1849596 A1 | 10/2007 |
| EP | 1882636 A2 | 1/2008 |
| EP | 1990486 A1 | 11/2008 |
| FR | 2876945 A1 | 4/2006 |
| JP | S63-163009 A | 6/1988 |
| JP | H09-174607 A | 7/1997 |
| JP | H11-334418 A | 12/1999 |
| JP | 2000-085355 A | 3/2000 |
| JP | 2001-225387 A | 8/2001 |
| JP | 2002-018908 A | 1/2002 |
| JP | 2002225139 A | 8/2002 |
| JP | 3358915 B2 | 12/2002 |
| JP | 2005-067529 A | 3/2005 |
| JP | 2005-279990 A | 10/2005 |
| JP | 2005-306310 A | 11/2005 |

OTHER PUBLICATIONS

European Office Action dated Oct. 19, 2009 (corresponding EP Appn. No. 0 815 7984.9), 3 pages.

Office Action for copending U.S. Appl. No. 11/673,704, mailed Feb. 6, 2009, 11 pages.

Office Action for copending U.S. Appl. No. 11/673,704, mailed Jul. 14, 2010, 7 pages.

Office Action for copending U.S. Appl. No. 11/673,704, mailed Jul. 17, 2009, 9 pages.

Office Action for copending U.S. Appl. No. 11/673,704, mailed Jan. 6, 2010, 10 pages.

Office Action for copending U.S. Appl. No. 11/766,812, mailed Jun. 25, 2009, 14 pages.

Office Action for copending U.S. Appl. No. 11/766,812, mailed Jan. 20, 2010, 21 pages.

Office Action for copending U.S. Appl. No. 11/766,812, mailed May 27, 2010, 13 pages.

Office Action for copending U.S. Appl. No. 11/766,813, mailed Oct. 28, 2009, 12 pages.

Office Action for copending U.S. Appl. No. 11/766,813, mailed Apr. 1, 2009, 12 pages.

Final Office Action mailed Dec. 14, 2010 from copending U.S. Appl. No. 11/766,813, filed Jun. 22, 2007, 17 pages.

Colleen Northeim, Mary W. Moore and John L. Warren, Surface-Coating-Free Materials Workshop Summary Report, Center for Environmental Analysis, Center for Environmental Analysis, EPA 600R-92-159, Aug. 1992.

Advanced Composites, Material Processing Guidelines and Troubleshooting Guide, ACP 2004, 2005) Last Update Mar. 3, 2005.

Solvay Press Office, United States: Solvay Engineered Polymers Innovates, Development of a mold-in-color metallic engineered polyolefin, Feb. 14, 2000, http://www.solvaypress.com/pressreleases/0,,64-2-0,00.htm.

Office Action dated Aug. 6, 2012 in EP Appn. No. 08 157 984.9, filed Jun. 10, 2008, 6 pgs.

* cited by examiner

MOLDING SYSTEM AND MOLDED-IN-COLOR PANEL

CROSS-REFERENCE TO RELATED APPLICATIONS

This application is a division of U.S. application Ser. No. 11/766,812 filed Jun. 22, 2007. The disclosure of which is incorporated in its entirety by reference herein.

BACKGROUND OF THE INVENTION

1. Field of the Invention

The multiple embodiments of the present invention relate to molded-in-color panels and molding systems for creating molded-in-color panels.

2. Background Art

Vehicle panels are an example of molded-in-color panels. Vehicle panels may be on the interior or exterior of a vehicle, commonly have surfaces, which are exposed to a viewable environment. These exposed surfaces are often referred to as class-A surfaces. It is desirable to create these class-A surfaces to have few or no surface defects or flaws when compared to non class-A surfaces. Since class-A surfaces are exposed to a viewable environment, these surfaces are formed using tighter tolerances and greater detail. Non class-A surfaces are not exposed in the viewable environment and may have visible surface defects and flaws.

Vehicle panels with class-A surfaces are not typically injection-molded, compression-molded or vacuum-molded unless the vehicle panels are painted in a secondary painting operation, covering surface defects. Painting the vehicle panel in a secondary painting operation requires additional time and cost to create the vehicle panel. Paint is also susceptible to peeling, chipping, blistering and/or delamination.

Molded-in-color plastics are a lower cost option for programs to consider instead of current painted technologies and/or other decorative alternatives, such as paint film or other laminates. Molded-in-color plastics are also environmentally friendly because molded-in-color plastics do not require a secondary painting process so molded-in-color plastics may be easily recycled and manufacturing of molded-in-color plastics does not generate volatile organic compounds.

SUMMARY OF THE INVENTION

In one embodiment, a molding system for creating a molded-in-color panel is disclosed. The molding system has a first mold member with a first forming surface for forming a portion of a panel with an exposed surface. The molding system has a second mold member with a second forming surface for forming a concealed portion of the panel. One of the first and second mold members is translatable relative to the other to collectively receive a heated molded-in-color resin to form the panel. The molding system has an injector for injecting molded-in-color resin into the mold. The second forming surface is sufficiently smooth so that the exposed surface of the panel is free of visible flow lines.

In another embodiment, a method for creating a molded-in-color panel in a mold is disclosed. The method discloses providing a mold having a first mold member and a second mold member. The first mold member has a first forming surface to produce an exposed portion of a molded-in-color panel. The second mold member has a second forming surface to produce a concealed portion of a molded-in-color panel. The second forming surface has a sufficiently smooth surface to prevent visible flow lines. The method discloses injecting molded-in-color resin in the mold and cooling the molded-in-color resin to form a molded-in-color panel. The exposed portion of the panel formed by the other of the forming surface of the first or second mold members is generally free of flow lines.

In yet another embodiment, a molded-in-color panel is disclosed by providing a mold having a first mold member and a second mold member. The first mold member has a first forming surface to produce an exposed portion of a molded-in-color panel. The second mold member has a second forming surface to produce a concealed portion of a molded-in-color panel. The second forming surface has a sufficiently smooth surface to prevent visible flow lines. The steps require injecting molded-in-color resin in the mold and cooling the molded-in-color resin to form a molded-in-color panel. The exposed portion of the panel is formed by the other of the forming surface of the first or second mold members is generally free of flow lines.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

When a panel is designed with bosses on an non-exposed side and holes formed through a body of a panel, a defect-free class-A surface is difficult to fabricate and often expensive even when using molded-in-color plastic. Injection-molding, compression-molding, or vacuum-molding the panel with holes results the appearance of visible knit lines, flow lines or sink marks on the class-A surface. A secondary cutting operation is often performed on the panel to create the holes. A secondary cutting operation requires additional time and cost to produce the panel.

When panels are formed using injection-molding, compression-molding or vacuum-molding, class-A surfaces without defects are difficult to create because of the appearance of knit lines, mold flow lines and sink marks. Since such surface defects are difficult to eliminate and/or control using injection-molding, compression-molding or vacuum-molding. In addition, when metallic molded-in-color resin is utilized, creating a defect-free class-A surface is extremely difficult because metallic molded-in-color resin has a high propensity for surface defects. Although molded-in-color plastics offer benefits, it is still extremely difficult to mold parts in color without visible appearance of knit lines, flow lines or sink marks on a class-A surface.

Figure 1:
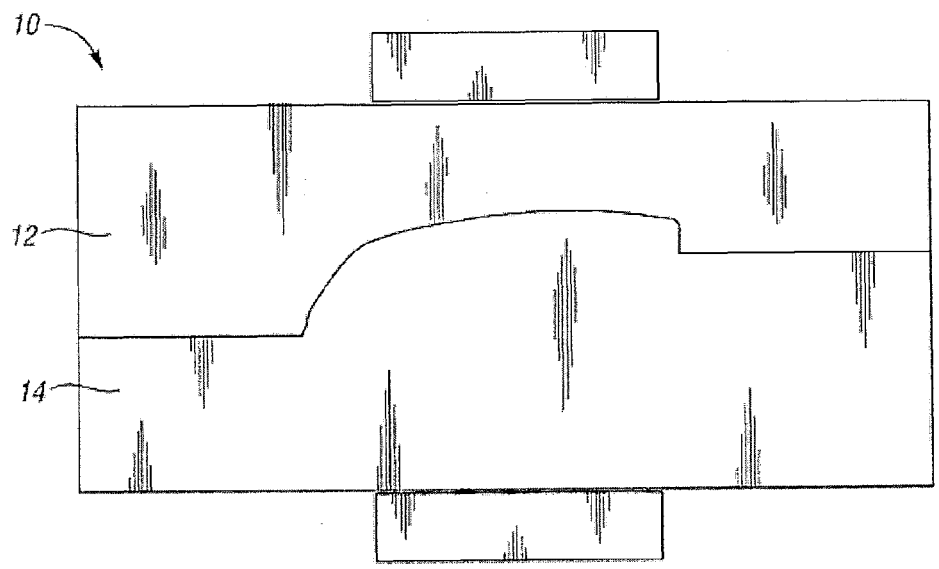
FIG. 1 is a side elevation view of a mold.

Referring now to FIG. 1, a mold for creating a molded-in-color panel is illustrated and referenced generally by numeral 10. The panel 10 may be any suitable molded-in-color panel 10. In one embodiment, the panel 10 is a vehicle panel 10, which is employed on an interior or exterior of a vehicle. Of course, any molded-in-color panel 10 is contemplated within the scope of the present invention. The mold 10 has a first mold half 12 and a second mold half 14. In another embodiment, the mold 10 may have three or more mold portions, which collectively form the mold 10. Any number of mold portions is contemplated within the scope of the present invention.

In one embodiment, the first mold half 12 is referred to as a cavity because the first mold half 12 may have a substantial recess for receiving the second mold half 14. The second mold half 14 is referred to as a core because the second mold half 14 has a substantial projection which is received in the cavity 12.

The core 14 may be moveable relative to the cavity 12. By providing a stationary cavity 12 and a moveable core 14, a vehicle panel may be retained within the mold 10 on the core 14 after molding the vehicle panel, which may be generally easily ejected or removed after the mold 10 is opened. It is also contemplated within the scope of the invention that the cavity 12 may be moveable while the core 14 is stationary. If three or more mold portions are employed, at least one mold portion may be moveable relative to at least a second mold portion.

Figure 2:
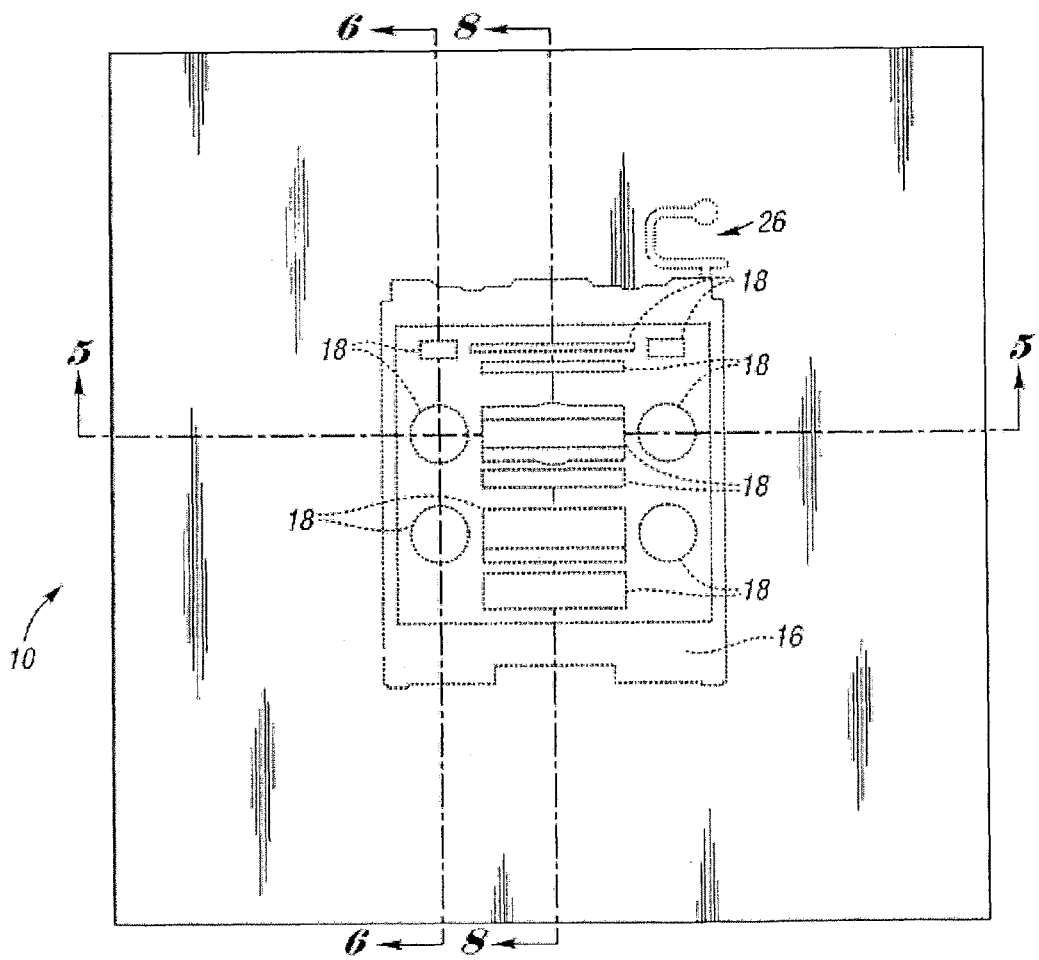
FIG. 2 is top plan view of the mold of FIG. 1.

Referring now to FIG. 2, a top plan view of the mold 10 of FIG. 1 is illustrated. To create a vehicle panel 16, a heated resin is injected into the mold 10 through a resin inlet. In one embodiment, the resin inlet is a gate.

The heated resin has molded-in-color so that a secondary painting operation is not required. In one embodiment, the heated resin and the colorant may be separately injected into the mold 10. The resin may have material properties comparable with a thermoplastic polyolefin (TPO) or a polycarbonate-acrylonitrile butadiene styrene (PC/ABS).

The resin may also contain metallic molded-in-color for vehicle panel applications for use in the interior of the vehicle, for example. Using a metallic molded-in-color resin in a typical mold creates large amounts of surface defects, which are not visually appealing. The metallic molded-in-color resin may achieve a low gloss, quality, metallic appearance once injection-molded, compression-molded, or vacuum-molded. The resulting vehicle panel delivers an enhanced metallic appearance over paint and offers a low-cost option to using aluminum and/or decorative films.

As illustrated in FIG. 2, the injected heated resin takes the shape of the vehicle panel 16 without any holes 18 formed through the vehicle panel 16. If desired, when the vehicle panel 16 is partially cooled within the mold 10, at least one hole 18 may be punched through the vehicle panel 16.

In one embodiment, to punch the holes 18 through the vehicle panel 16, the vehicle panel 16 is partially cooled. The temperature of the partially cooled vehicle panel 16 is less than a melting temperature of the vehicle panel 16 and near a plasticizing temperature of the vehicle panel 16. The temperature of the partially cooled vehicle panel 16 may be near a plasticizing temperature of the vehicle panel 16, which is near the softening point of the material used to form the vehicle panel 16. The vehicle panel 16 can be punched before the panel 16 is fully cooled to avoid internal stresses, which are formed when punching a fully cooled vehicle panel. Any number of holes 18 may be punched through the vehicle panel 16 in accordance with a desired design for the vehicle panel 16.

Figure 3:
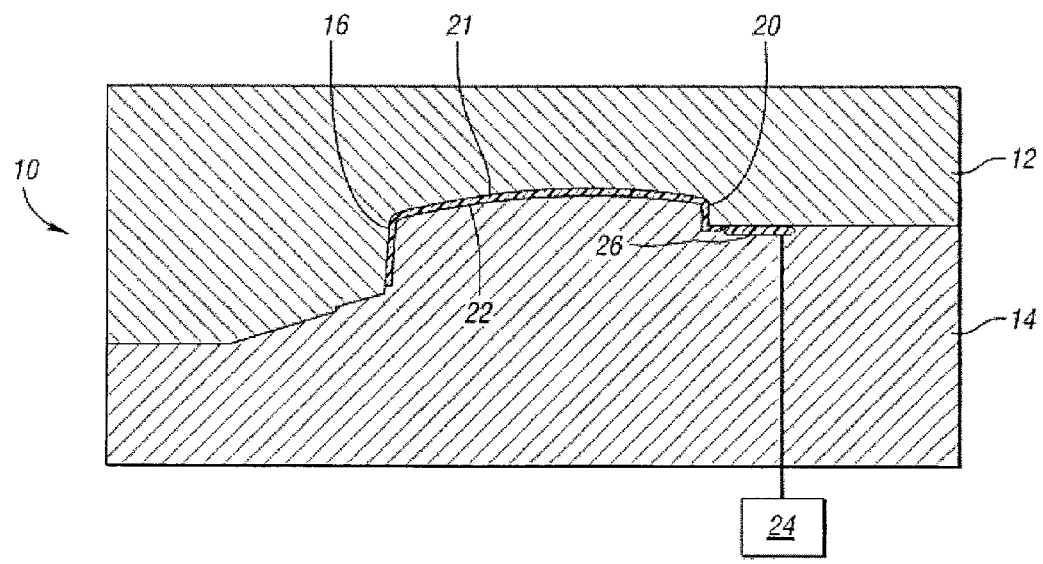
FIG. 3 is a cross-section view of the mold of FIG. 1.

Referring now to FIG. 3, a cross-section view of the mold 10 of FIG. 2 taken along line 3-3 is illustrated. The mold 10 has a cavity 12, which is stationary, and a core 14, which is moveable relative to the cavity 12. The cavity 12 may also be moveable relative to the core 14. The mold 10 is illustrated in a closed position while a vehicle panel 16 is being formed.

The cavity 12 has a first forming surface 20 for cooperating with a second forming surface 22 of the core 14. The first forming surface 20 and the second forming surface 22 collectively provide an outer boundary for the vehicle panel 16. In another embodiment, three or more forming surfaces are provided to collectively define the outer boundary of a vehicle panel.

The second forming surface 22 of the core 14 is smooth so that when the heated resin is injected into the core 14 at a sufficient injection rate, the resin flows over the second forming surface 22 without disturbance. Flow disturbance of the heated resin creates knit lines, flow lines and sink marks in the vehicle panel 16, so an adequate smoothness for the second forming surface 22 is desired. This smoothness can be measured as a tolerance for any surface feature or projection that extends a height from a flow surface, hereinafter referred to as a height tolerance. Such surface features or projections disturb the flow of the resin when the surface features or projections are outside of the tolerance. The height tolerance should be about fifteen percent of a thickness of the vehicle panel 16 or less because anything outside of this range causes flow disturbance in the mold 10 and surface defects in the vehicle panel 16. The height tolerance for the second forming surface 22 may be less than one half of a millimeter when the vehicle panel 16 is three and a half millimeters thick so that no protuberance extends beyond one millimeter beyond the second forming surface 22.

The height tolerance to thickness ratio of fifteen percent or less was empirically tested by forming the second forming surface 22 with an arbitrary projection that was ground to various smaller surface tolerances. In one embodiment, the vehicle panel 16 had a thickness of three and a half millimeters. Each smaller tolerance range was tested by injection-molding a vehicle panel 16 into the mold 10 to see if the vehicle panel 16 formed had any visible surface defects on the exposed, visible side 21 of the vehicle panel 16. Once the arbitrary projection formed in the second forming surface 22 was ground down to a surface height tolerance of one half of a millimeter or less, the molded-in-color resin was no longer disturbed so that the exposed, visible surface 21 of the vehicle panel 16 had no visible surface defects.

Once the heated resin begins to cool as formed by the adequately smooth second forming surface 22, knit lines, flow lines and sink marks are not visible in the vehicle panel 16 on an exposed, visible side 21. The exposed, visible side 21 is formed by the first forming surface 20 and is visible when installed in a vehicle. Since the exposed, visible side 21 of the vehicle panel 16 does not have visible knit lines, flow lines or sink marks, a class-A surface for a metallic molded-in-color vehicle panel 16 is achieved without a secondary painting process. In another embodiment, the core 14 is formed with a generally smooth second forming surface 22.

Figure 4:
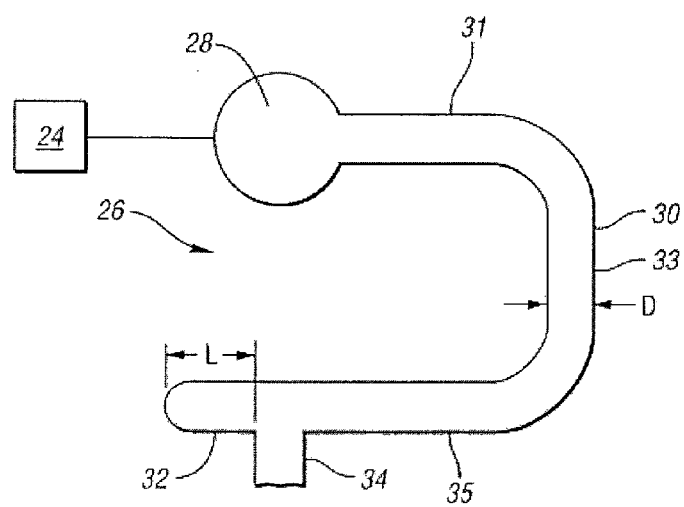
FIG. 4 is a schematic view of the gating assembly of FIG. 3.

Referring now to FIGS. 3 and 4, an injector 24 is illustrated connected to the mold 10 of FIG. 3 to provide a sufficient flow rate of heated resin to the mold 10 to form the vehicle panel 16. The injector 24 is fluidly connected to a gating assembly 26. In one embodiment, the gating assembly 26 provides the heated resin from the injector 24, through the second forming surface 22 of FIG. 3. The second forming surface 22 is the mold flow surface. Of course, multiple injectors 24 and gating assemblies 26 may be employed to inject heated resin. Any suitable known molded-in-color injector 24 is contemplated within the scope of the invention.

The gating assembly 26 connects the injector 24 to the second forming surface 22. A first end of the gating assembly 26 from the injector 24 includes a sprue 28. The sprue 28 is connected to a runner 30. The runner 30 is connected to both a cold slug well 32 and a gate 34. The cold slug well 32 traps impurities from the heated resin by providing a reservoir for the impurities, such as a cold slug produced from cooled resin and air pockets in the heated resin. The gate 34 is connected to the second forming surface 22 of FIG. 3.

In one embodiment, the gate 34 has an increased length and an increased diameter. The gate 34 may have a length of three and a half millimeters. With a larger length, the diameter may be increased to three hundred seventy-five thousandths of a millimeter to accommodate the increased length of the gate. The increased length and diameter allow for more material to flow across the cavity 12 to minimize a pressure required to fill a vehicle part without deformations, such as sink marks.

The runner 30, as illustrated in FIG. 4, has a first runner portion 31, which is connected to the sprue 28 at one end of the runner 30, and a second runner portion 33 at a second end of the runner 30. The second runner portion 33 may be generally perpendicular to the first runner portion 31. The second runner portion 33 is connected to a third runner portion 35. The second runner portion 33 may be perpendicular with the third runner portion 35. The third runner portion 35 is connected to both the cold slug well 32 and the gate 34. The third runner portion 35, as illustrated, is generally parallel with the first runner portion 31.

The configuration of the runner 30 illustrated delivers heated resin from the sprue 28 to the gate 34 at a sufficient flow rate to facilitate forming a vehicle panel in the mold 10, of FIG. 3, with minimized visible knit lines, flow lines and sink marks on an exposed side of the vehicle panel.

As illustrated in FIG. 4, the runner 30 has a diameter D. The cold slug well 32 extends beyond the gate 34 a length L. In at least one embodiment, the length L that the cold slug well 32 extends beyond the gate 34 is at least one and a half times the diameter D of the runner 30. The ratio of the length L to the diameter D may be at least one and a half to one, which was determined and found suitable through extensive testing. The relative sizing of the runner 30 and the cold slug well 32 allows the cold slug well 32 to trap impurities from entering through the gate 34 to improve the quality of a vehicle panel formed in the mold 10 of FIG. 3.

Figure 5:
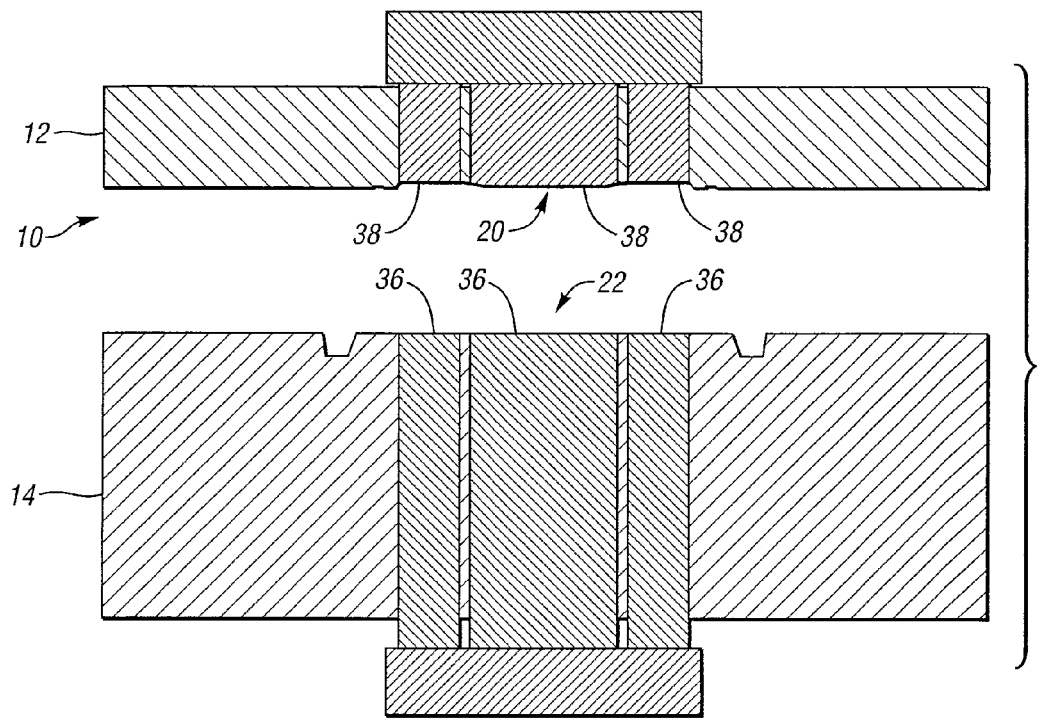
FIG. 5 is a cross-section view of the mold of FIG. 2 along line 5-5.
Figure 6:
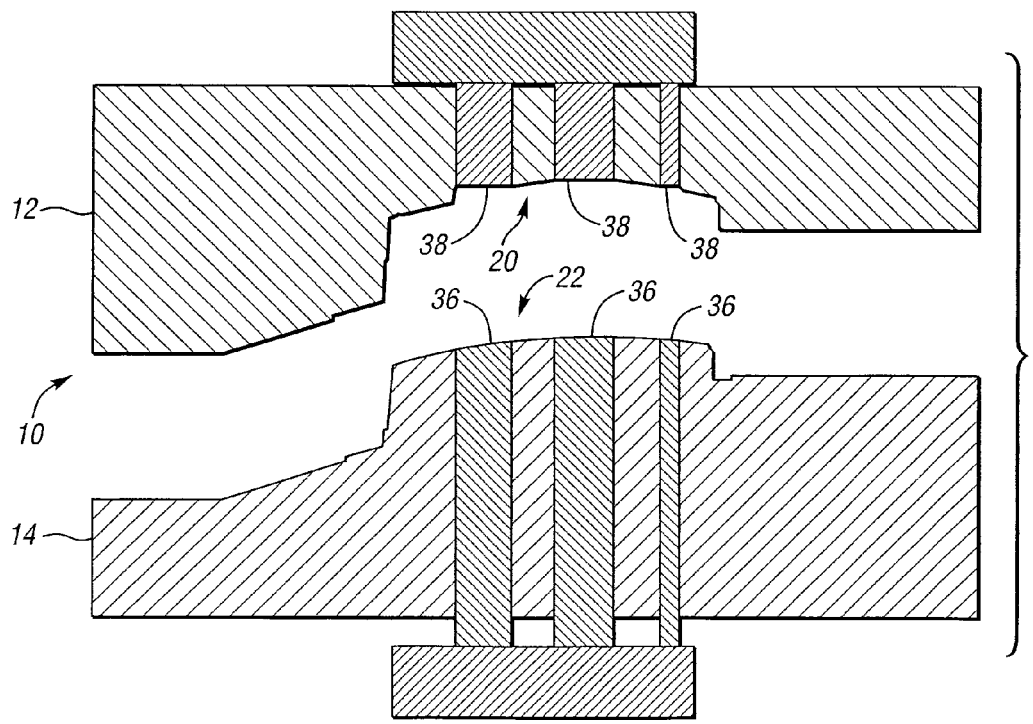
FIG. 6 is another cross-section of the mold of FIG. 2 taken along line 6-6.

Referring now to FIGS. 5 and 6, the mold 10 is illustrated in cross-section taken along the lines 5-5 and 6-6, respectively. The mold 10 has a cavity 12, which is stationary, and a core 14, which is moveable relative to the cavity 12. The cavity 12 may also be moveable relative to the core 14. The mold 10 is illustrated in an open position, which may occur before a vehicle panel is formed or after a vehicle panel is formed.

The core 14 may have at least one punch 36, as described in U.S. patent application Ser. No. 11/673,704 filed on Feb. 12, 2007, which is hereby incorporated in its entirety by reference herein. Although three punches 36 are illustrated, any number of punches 36 is contemplated within the scope of the present invention. When the mold 10 is in the open position as illustrated, the punches 36 are in a first, non-extended position. After a heated resin is injected into the mold 10 over the smooth second forming surface 22 and partially cooled, the punches 36 extend through the second forming surface 22, through the partially cooled vehicle panel and into the first forming surface 20. Once the punches 36 extend through the partially cooled vehicle panel and into anvils 38, holes are formed through the vehicle panel, which eliminates the need for a secondary cutting or punching operation for the vehicle panel and produces no visible knit lines, flow lines or sink marks.

The second forming surface 22 may be provided with at least one punch 26, which is actuatable. Each of the punches 26 illustrated form a portion of the second forming surface 22. An intersection between the punches 26 and the second forming surface 22 may be adequately smooth to allow heated resin to flow over the second forming surface 22 without disturbance so that an exposed side of a vehicle panel is free of visible knit line, flow lines and sink marks. A small height tolerance between the intersection of the punches 26 and the second forming surface 22 is desired. The height tolerance at the intersection of the punches 26 and the second forming surface 22 may be about fifteen percent of a thickness of the vehicle panel 16 or less.

The first forming surface 20 may be provided with at least one sliding anvil 38 to receive at least one corresponding punch 36. The anvils 38 correspondingly move with the punches 36 to allow the punches 36 to extend through the first forming surface 20 so that the punches 36 remove a portion of a vehicle panel. Three anvils 38 are illustrated which correspond with the three punches 36. Any number of anvils 38 is contemplated within the scope of the present invention.

An intersection between the anvils 38 and the first forming surface 20 may be adequately smooth to allow heated resin to flow in the mold 10 without disturbance so that an exposed side of a vehicle panel is free of visible knit line, flow lines and sink marks. A small height tolerance between the intersection of the anvils 38 and the first forming surface 20 is desired. The height tolerance at the intersection of the anvils 38 and the first forming surface 20 may be about fifteen percent of a thickness of the vehicle panel 16 or less.

Figure 7:
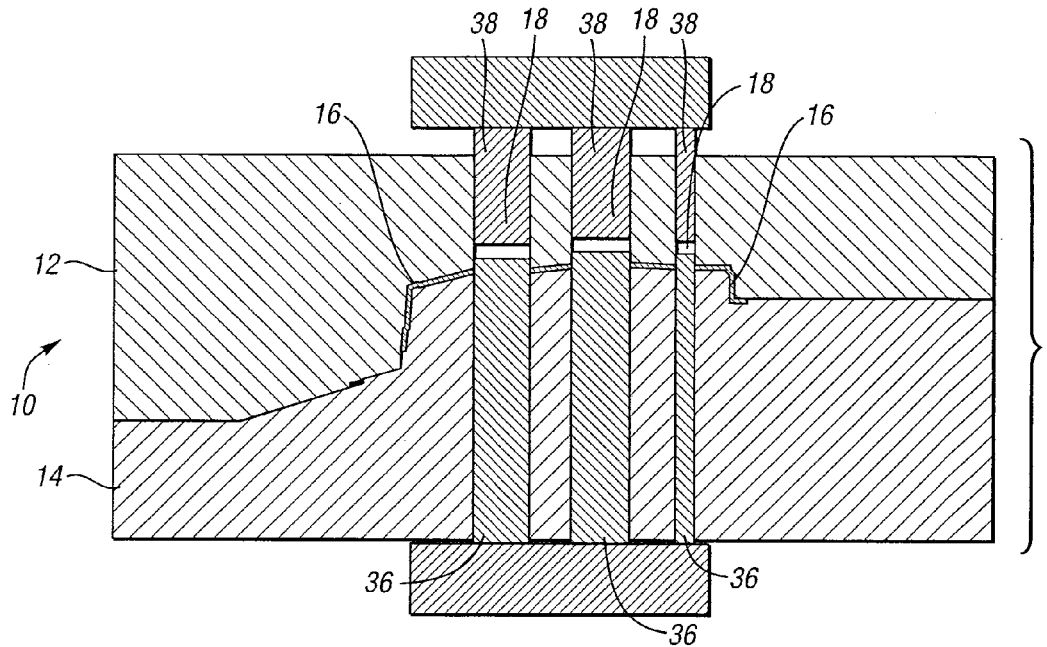
FIG. 7 is yet another cross-section view of the mold of FIG. 2 taken along line 6-6.

Referring now to FIG. 7, the mold 10 is illustrated in cross-section taken along the line 6-6, which corresponds with the cross-section of FIG. 6. The mold 10 is illustrated in a closed position, after heated resin has been injected over the smooth second forming surface 22. Once the heated resin has partially cooled, the punches 36 extend through the partially cooled resin into the anvils 38 forming holes 18 through the vehicle panel 16. The cavity 14 may then move linearly away from the core 12, as illustrated in FIG. 8, so that the vehicle panel 16 may be ejected or removed from the mold 10.

Figure 8:
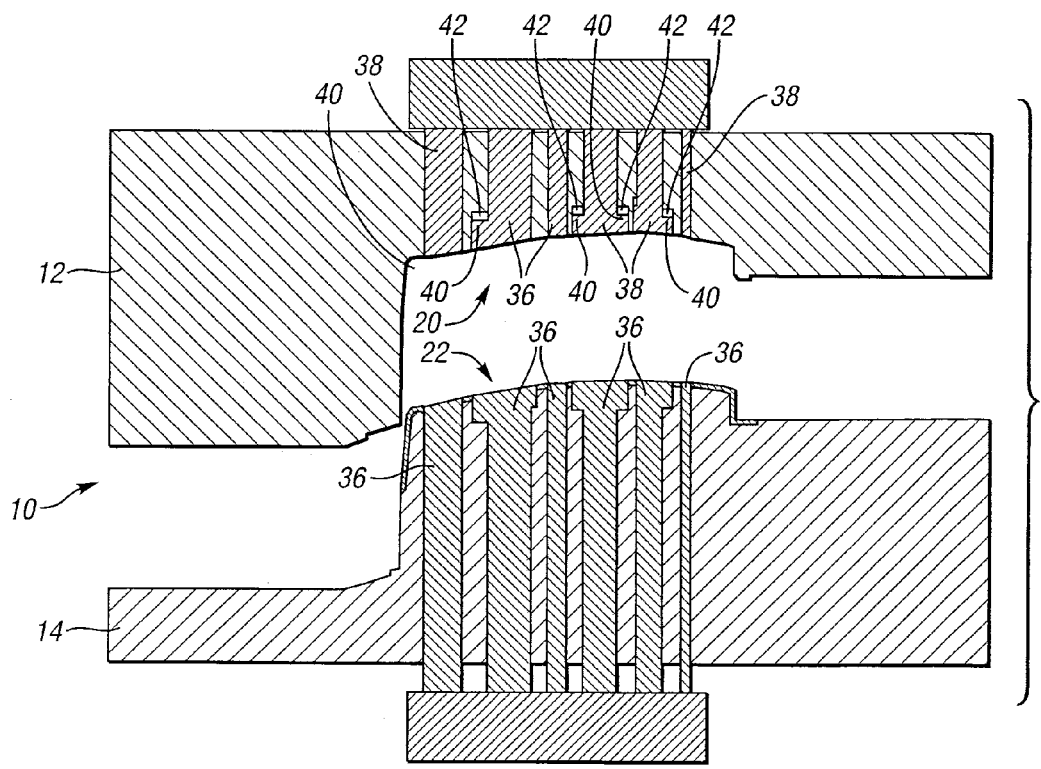
FIG. 8 is another cross-section view of the mold of FIG. 2 taken along line 8-8.

Referring now to FIG. 8, the anvil 38 may be provided with at least a shoulder 40. If a shoulder 40 is provided on the anvil 38, a shoulder aperture 42 may be provided to receive the shoulder 40 when the punch 36 is nested within the anvil 38. The shoulder 40 may provide a stop for the linear translation of the punch 36 and the anvil 38. The shoulder 40 may decrease the force required to move the anvil 38 by decreasing the total weight of the anvil 38.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A molding system for creating a molded-in-color panel, the molding system comprising:
 a first mold member having a first forming surface for forming a portion of a panel with an exposed surface;
 a second mold member having a second forming surface for forming a concealed portion of the panel, one of the first and the second mold members being translatable relative to the other to collectively receive a heated resin with a molded-in-color to form the panel, second forming surface having a tolerance such that a height change of a projection along the second forming surface does not exceed fifteen percent of a thickness of the panel;

an injector for injecting molded-in-color resin into the first and second mold members;

at least one punch provided within one of the first or second mold members, the at least one punch being actuatable to extend through the second forming surface of one of the second mold member and being actuatable to form an aperture through a partially cooled panel; and a nest provided in the first mold member such that the at least one punch extends to through the nest to nest therein, wherein a punch surface of the punch and the second forming surface of the second mold has a height difference that does not exceed fifteen percent of a thickness of the panel so that any projection along the concealed portion ensures the exposed surface of the panel is free of visible flow lines and wherein the height tolerance along the concealed portion ensures that the exposed surface is generally free of flow lines adjacent any projections.

2. The molding system of claim 1 wherein the injector further comprises:

a sprue portion to receive heated molded-in-color resin from the injector;

a runner to transmit the heated molded-in-color resin therethrough, the runner having a first end in communication with the sprue and a second end;

a gate portion in fluid communication with the second end of the runner to one of the first mold member and the second mold member; and a cold slug well portion in fluid connection with the second end of the runner to inhibit impurities in the heated molded-in-color resin from entering the one of the first mold member and the second mold member;

wherein the cold slug well portion has a length that is approximately one and a half times greater than a diameter of the runner.

3. The molding system of claim 2 wherein the runner is further defined as a first runner portion in fluid communication with the sprue, a second runner portion in fluid communication with the first runner portion, and a third runner portion in fluid communication with the gate, the cold slug well portion and the second runner portion such that the first runner portion is in fluid communication with the second runner portion with an angle approximately equal to ninety degrees and the second runner portion is in fluid communication with the third runner portion with an angle approximately equal to ninety degrees.

4. The molding system of claim 2 wherein the gate redirects the heated molded-in-color resin from the runner approximately ninety degrees.

5. The molding system of claim 2 wherein the runner is further defined as a first runner portion in fluid communication with the sprue, a second runner portion in fluid communication with the first runner portion, and a third runner portion in fluid communication with the gate, the cold slug well portion and the second runner portion such that the first runner portion and the third runner portion are generally parallel.

6. The molding system of claim 5 wherein the first runner portion is generally perpendicular to the second runner portion.

7. The molding system of claim 5 wherein the second runner portion is generally perpendicular to the third runner portion.

8. The molding system of claim 5 wherein the second runner portion is generally perpendicular to the first runner portion and the third runner portion.

9. The molding system of claim 5 wherein the cold well portion is generally aligned with the third portion.

10. The molding system of claim 1 wherein the first and second mold members collectively provide an outer body for the panel.

11. A system comprising:

a first mold member for forming an exposed portion of a molded-in-color panel;

a second mold member for forming a concealed portion of the panel having a tolerance such that a height change of a projection along the concealed portion does not exceed fifteen percent of a thickness of the panel; and at least one punch provided within one of the first or second mold members, the at least one punch being actuatable to form an aperture through a partially cooled panel;

a nest provided in the other of the first mold member such that the at least one punch extends to through to the nest to nest therein;

wherein at least one of a punch surface and a nest surface is substantially coplanar with a flow surface of the second mold member so that a height difference between the flow surface of the second mold and the at least one the punch surface and the nest surface and has a height difference that does not exceed fifteen percent of a thickness of the panel so that any projection along the concealed portion ensures the exposed portion of the panel is free of visible flow lines and wherein the tolerance along the concealed portion ensures that the exposed portion is generally free of surface defects.

12. The molding system for creating a molded-in-color panel the molding system comprising:

a first mold member having a first forming surface for forming a portion of a panel with an exposed surface;

a second mold member having a second forming surface for forming a concealed portion of the panel, one of the first and the second mold members being translatable relative to the other to collectively receive a heated resin with a molded-in-color to form the panel, second forming surface having a tolerance such that a height change of a projection along the second forming surface does not exceed fifteen percent of a thickness of the panel;

an injector for injecting molded-in-color resin into the first and second mold members;

at least one punch provided within one of the first or second mold members, the at least one punch being actuatable to extend through the forming surface of one of the second mold member and being actuatable to form an aperture through a partially cooled panel; and a nest provided in the other of the first mold member such that the at least one punch extends to through to the nest to nest therein;

wherein at least one of a punch surface and a nest surface is substantially coplanar with the surface the second forming surface so that a height difference between the forming surface of the second mold and at least one of the punch surface and the nest surface and has a height difference that does not exceed fifteen percent of a thickness of the panel so that any projection along the concealed portion ensures the exposed surface of the panel is free of visible flow lines and wherein the height tolerance along the concealed portion ensures that the exposed surface is generally free of flow lines adjacent any projections.

* * * * *